(12) United States Patent
Yamaki et al.

(10) Patent No.: US 8,139,776 B2
(45) Date of Patent: Mar. 20, 2012

(54) WIRELESS RECEIVING APPARATUS AND ELECTRONIC APPLIANCE

(75) Inventors: Toshiyuki Yamaki, Shizuoka (JP); Hiroyuki Suzuki, Shizuoka (JP); Junsei Abe, Shizuoka (JP)

(73) Assignee: Sony Corporation, Tokyo (JP)

( * ) Notice: Subject to any disclaimer, the term of this patent is extended or adjusted under 35 U.S.C. 154(b) by 1013 days.

(21) Appl. No.: 12/101,308

(22) Filed: Apr. 11, 2008

(65) Prior Publication Data

US 2008/0253602 A1 Oct. 16, 2008

(30) Foreign Application Priority Data

Apr. 13, 2007 (JP) .................... P2007-106151

(51) Int. Cl.
*H04B 3/00* (2006.01)
(52) U.S. Cl. .................... 381/26; 381/80; 381/306
(58) Field of Classification Search .............. 381/26, 381/80, 306
See application file for complete search history.

(56) References Cited

U.S. PATENT DOCUMENTS

| 5,859,522 | A | * | 1/1999 | Theobald | ........... 320/106 |
|---|---|---|---|---|---|
| 5,925,942 | A | | 7/1999 | Theobald | |
| 2003/0162497 | A1 | | 8/2003 | Curtiss et al. | |
| 2004/0052515 | A1 | | 3/2004 | Nishida et al. | |
| 2004/0081099 | A1 | | 4/2004 | Patterson et al. | |

FOREIGN PATENT DOCUMENTS

| JP | 8 227332 | 9/1996 |
|---|---|---|
| JP | 11 215730 | 8/1999 |
| JP | 2000 14037 | 1/2000 |
| JP | 2004 312468 | 11/2004 |
| WO | WO 00 65445 | 11/2000 |
| WO | WO 2005 057782 | 6/2005 |
| WO | WO 2005 060224 | 6/2005 |

* cited by examiner

*Primary Examiner* — Minh-Loan T Tran
(74) *Attorney, Agent, or Firm* — Frommer Lawrence & Haug LLP; William S. Frommer; Thomas F. Presson

(57) ABSTRACT

A wireless receiving apparatus that includes a connector including a plurality of terminals. A predetermined terminal is assigned as an identification terminal for identifying an electronic appliance connected to the connector, and a circuit for generating an identification signal of a level corresponding to a voltage level of the predetermined terminal when the electronic appliance is connected to the connector, and for identifying the electronic appliance connected to the connector based on the level of the identification signal.

11 Claims, 9 Drawing Sheets

UNABLE TO OPERATE

FIG. 7B

OPERATING ON ONLY ONE CHANNEL

WIRELESS RECEIVING APPARATUS AND ELECTRONIC APPLIANCE

CROSS REFERENCES TO RELATED APPLICATIONS

The present invention contains subject matter related to Japanese Patent Application JP 2007-106151 filed in the Japanese Patent Office on Apr. 13, 2007, the entire contents of which being incorporated herein by reference.

BACKGROUND OF THE INVENTION

1. Field of the Invention

The invention relates to a wireless receiving apparatus including a connector with a plurality of terminals and an electronic appliance that is connected to a wireless receiving apparatus using a connector with a plurality of terminals.

2. Description of the Related Art

In recent years, in the field of television broadcasting, it has become common to record audio transferred using wireless microphones. FIGS. 1A and 1B show an example of the appearance of a wireless microphone. Of such drawings, FIG. 1A shows a wireless microphone transmitter (hereinafter simply called "transmitter") as an apparatus for transmitting audio. A transmitter 21 transmits radio waves modulated by an audio signal from a microphone.

FIG. 1B shows a wireless microphone receiver (hereinafter simply called "receiver") as an apparatus for receiving audio. A receiver 22 receives the radio waves transmitted from the transmitter 21 and demodulates the audio signal. A connector 22a that includes a plurality of terminals for outputting an audio signal and inputting an external power supply is provided on a lower surface of the cover of the receiver 22. A display unit (such as a liquid crystal display) 22b for displaying a variety of information is provided on the surface of the cover of the receiver 22 and although not shown in the drawings, an operation unit for carrying out various setting operations is also provided.

FIG. 2A is a diagram showing one example of an audio recording system that uses a wireless microphone. The receiver 22 is attached to a slot 31a provided on a camcorder 31 (i.e., a video camera integrated with a recorder such as a VTR or optical disk apparatus). A connector of the same standard as the connector 22a of the receiver 22 is provided inside the slot 31a (one of such connectors being a male connector and the other a female connector).

The camcorder 31 supplies power to the receiver 22 while receiving audio transmitted from one transmitter 21 using the receiver 22. Such audio is inputted from the connector 22a (see FIG. 1B) of the receiver 22 into the camcorder 31 and is recorded in the camcorder 31 together with images picked up by the camcorder 31.

Until recently, the receiver of a wireless microphone has been only equipped with a function for receiving one channel of audio from a single transmitter. Corresponding to this fact, an existing video camera is only provided with sufficient signal lines (such as communication lines), circuits (such as audio processing circuits), and a power supply capacity for the case where a single-channel receiver is attached to the slot.

However, in recent years, increasing use of multiple audio channels has been made during the production of programs and the like, resulting in demand for individual receivers that can receive a plurality of audio channels. In response to such demand, receivers with a function for receiving a plurality of channels of audio and outputting such audio from a connector are being introduced.

Video cameras that are compatible with multi-channel receivers are also being introduced. Such video cameras have an increased power supply capacity and/or a larger number of signal lines and circuits for inputting audio signals on a plurality of channels when one of the multi-channel receivers described above is attached.

FIG. 2B is a diagram showing the same type of audio recording system as that shown in FIG. 2A. In this system, a multi-channel receiver is shown as a receiver 23, and a video camera that is compatible with the multi-channel receiver is shown as a video camera 32. The receiver 23 is attached to a slot 32a provided on the video camera 32. A connector of the same standard as the connector of the receiver 23 (i.e., a connector that corresponds to the connector 22a in FIG. 1B) is provided inside the slot 32a.

While power is being supplied from the video camera 32 to the receiver 23, audio transmitted from two transmitters 21 is received by the receiver 23, the audio on two channels is inputted from the connector of the receiver 23 into the video camera 32 and the audio on two channels is recorded by the video camera 32 together with images picked up by the video camera 32.

In this way, it is becoming common for the broadcasting equipment at a television channel to include both multi-channel receivers and older single-channel receivers and both multi-channel-receiver-compatible camcorders and older single-channel-receiver-compatible camcorders.

However, when a multi-channel receiver is attached to a slot of an older single-channel-receiver-compatible camcorder, since the video camera will only have a small power supply capacity designed for a single-channel receiver, not only will the multi-channel receiver be unable to operate but the circuits inside the video camera will also become overloaded.

Also, when an older single-channel receiver is attached to a slot of a multi-channel-receiver-compatible camcorder, the signal lines and circuits that are only used when a multi-channel receiver is attached will not be connected. Thus, there is the possibility of noise appearing in the audio signal due to the effects of external noise and the like and of the operation of the video camera becoming unstable.

Here, as one technique for eliminating such operational difficulties, it would be possible to make the mechanism for attaching a multi-channel receiver to a multi-channel-receiver-compatible camcorder different to the mechanism for attaching a single-channel receiver to a single-channel-receiver-compatible camcorder to make it mechanically difficult to attach a multi-channel receiver to a single-channel-receiver-compatible camcorder, and mechanically difficult to attach a single-channel receiver to a multi-channel-receiver-compatible camcorder.

However, since a variety of appliances aside from receivers are connected to the video camera in the periphery of the slot for attaching a receiver, if the mechanism for attaching a receiver is changed, it will also become necessary to change the mechanisms for connecting other appliances. Changing the mechanisms for connecting various appliances merely in order to change the mechanism for attaching a receiver is also undesirable from the viewpoints of cost and ease of use of the video camera.

Note that although Japanese Unexamined Patent Application Publications No. 2000-14037 and No. H11-215730 each disclose a technology for identifying whether a battery or power supply adapter has been attached to a video camera, a technology for enabling a video camera and a receiver to identify one another has yet been disclosed.

SUMMARY OF THE INVENTION

Embodiments of the invention have attempted to make such receivers and video cameras identify one another without changing the mechanism for attaching the receiver to the video camera.

A wireless receiving apparatus according to an embodiment of the invention includes a connector including a plurality of terminals. In the connector of the wireless receiving apparatus, a predetermined terminal of the terminals is assigned as an identification terminal for identifying an electronic appliance connected to the connector. The wireless receiving apparatus also includes a circuit for generating an identification signal of a level corresponding to a voltage level of the predetermined terminal when the electronic appliance is connected to the connector, and for identifying the electronic appliance connected to the connector based on the level of the identification signal.

In this wireless receiving apparatus, a predetermined terminal of the plurality of terminals of a connector is assigned as an identification terminal for identifying an electronic appliance that is connected to the connector. The wireless receiving apparatus also includes a circuit for generating an identification signal of a level corresponding to a voltage level of the predetermined terminal when the electronic appliance is connected to the connector. The electronic appliance connected to the connector is identified based on the level of the identification signal.

In this way, the wireless receiving apparatus can automatically identify the connected electronic appliance using a specified terminal on the connector.

Accordingly, when the present invention is applied to a receiver such as that described in the Description of the Related Art, it is possible to automatically identify the video camera to which the receiver is attached without changing the mechanism for attaching the receiver to the video camera. This means that in accordance with the identification result, it is possible to facilitate operating a receiver and a video camera.

An electronic appliance connected with a wireless receiving apparatus according to an embodiment of the invention includes a connector including a plurality of terminals. In the electronic appliance, a predetermined terminal of the terminals is assigned as an identification terminal for identifying the wireless receiving apparatus connected to the connector. The electronic appliance also includes a circuit for generating an identification signal of a level corresponding to a voltage level of the predetermined terminal when the wireless receiving apparatus is connected to the connector, and for identifying the wireless receiving apparatus connected to the connector based on the level of the identification signal.

In this electronic appliance, a predetermined terminal of the plurality of terminals of a connector for connecting a wireless receiving apparatus is assigned as an identification terminal for identifying the wireless receiving apparatus connected to the connector. The electronic appliance further includes a circuit for generating an identification signal of a level corresponding to a voltage level of the predetermined terminal when the wireless receiving apparatus is connected to the connector. The wireless receiving apparatus connected to the connector is identified based on the level of the identification signal.

In this way, in the electronic appliance, the connected wireless receiving apparatus is automatically identified using a specified terminal of the connector.

Accordingly, when an embodiment of the present invention is applied to a video camera such as that mentioned in the Description of the Related Art, it is possible to automatically identify the attached receiver without changing the mechanism for attaching a receiver to a video camera. This implies that it is possible to facilitate operating a receiver and a video camera in accordance with the identification result.

According to the wireless receiving apparatus according to an embodiment of the invention, it is possible to automatically identify a connected electronic appliance by using a specified terminal of a connector provided on the wireless receiving apparatus.

According to the electronic appliance of the present embodiment, it is possible to automatically identify a connected wireless receiving apparatus by using a specified terminal of a connector provided on the electronic appliance for connecting a wireless receiving apparatus.

BRIEF DESCRIPTION OF THE DRAWINGS

FIGS. 7A and 7B are diagrams showing example displays of a display unit of a multi-channel receiver to which an embodiment of the invention has been applied;

DESCRIPTION OF THE PREFERRED EMBODIMENTS

Preferred embodiments of the invention will now be described in detail with reference to the attached drawings. Note that an example where an embodiment of the invention has been applied to a multi-channel receiver and a multi-channel-receiver-compatible camcorder like those described in the Description of the Related Art will be described.

Figures 3A, 3B:
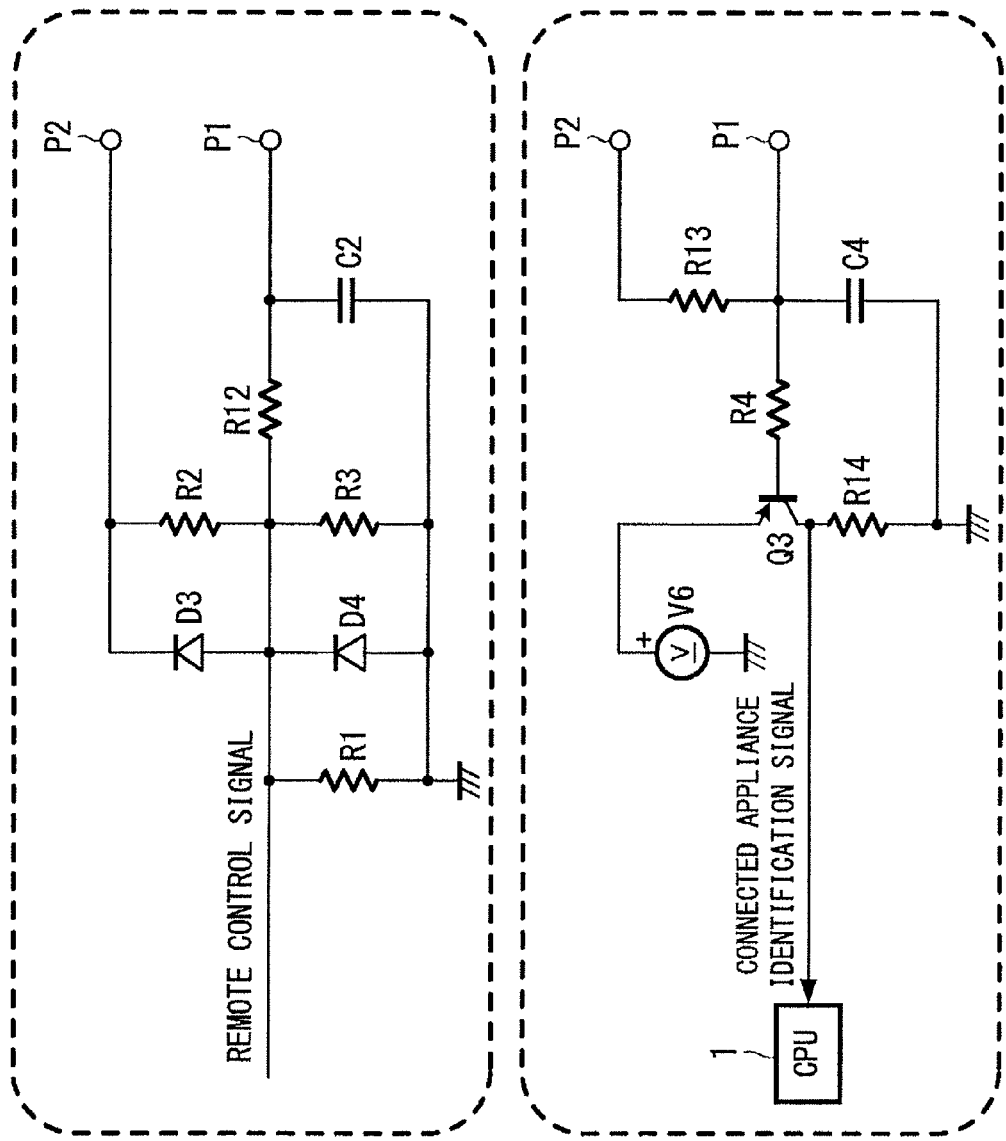
FIGS. 3A and 3B are diagrams showing circuit configurations of parts of receivers that relate to the present invention.

FIG. 3B is a diagram showing the circuit configuration of a part relating to the present invention, of a multi-channel receiver to which an embodiment of the invention has been applied. The receiver is provided with a D-sub 15-pin connector (a connector that corresponds to the connector 22a of receiver 22 shown in FIG. 1B) for outputting audio signals received on a plurality of channels, for inputting an external power supply, and the like. The seventh pin P1 of the D-sub 15-pin connector is assigned as a connected appliance identification terminal for identifying a video camera connected to the D-sub 15-pin connector.

Note that the existing single-channel receivers manufactured by the present applicant include receivers provided with a D-sub 15-pin connector for outputting an audio signal received on one channel, for inputting an external power supply, and the like. In such a single-channel receiver, eleven out of the fifteen pins of the D-sub 15-pin connector are assigned to various purposes such as outputting signals and inputting an external power supply, but the remaining four pins are unassigned. Of the eleven assigned pins, two of the pins are not actually used, with the seventh pin corresponding to one of such pins.

FIG. 3A is a diagram showing the circuit in the periphery of the seventh pin in an existing single-channel receiver manufactured by the present applicant (hereinafter referred to as a "single-channel receiver"), with the $7^{th}$ pin being assigned the same reference numeral as in FIG. 3B. A multi-channel receiver to which an embodiment of the invention has been applied will now be described in comparison to the receiver shown in FIG. 3A.

As shown in FIG. 3A, in the single-channel receiver, the seventh pin P1 is assigned as a remote control terminal for controlling the power supply of the receiver from the video camera. A resistor R12 is provided on a signal line for inputting the remote control signal from the seventh pin P1 and on this signal line, a position between the resistor R12 and the seventh pin P1 is grounded via a capacitor C2.

A pin P2 assigned as an external power supply input terminal of the pins of the D-sub 15-pin connector is connected via a resistor R2 and also via a diode D3 to the signal line mentioned above at positions on the opposite side of the resistor R12 to the seventh pin P1. The two connection points between this signal line and the pin P2 are also grounded via a resistor R3 and a diode D4, respectively. A position on this signal line on the opposite side of the connection points for the pin P2 to the seventh pin P1 is also grounded via a resistor R1.

In reality, as will be described later with reference to FIG. 4A, in an existing single-channel-receiver-compatible camcorder, the seventh pin of a D-sub 15-pin connector is an open terminal that is not connected to anything. Accordingly, in a single-channel receiver also, the seventh pin P1 shown in FIG. 3A is not actually used.

In the multi-channel receiver to which an embodiment of the invention has been applied, out of the fifteen pins of a D-sub 15-pin connector, the nine pins that are actually used by a single-channel receiver (the pins aside from the unused pins of the eleven pins that are assigned) are assigned to the same purposes as in a single-channel receiver.

In this multi-channel receiver, as shown in FIG. 3B, the signal line connected to the seventh pin P1 assigned as the connected appliance identification terminal is connected to a base of a pnp-type transistor Q3 via a resistor R4. The pin P2 (i.e., a pin assigned as an external power supply input terminal in the same way as in a single-channel receiver) of the D-sub 15-pin connector is connected via a resistor R13 to a position between the resistor R4 and the seventh pin P1 on this signal line.

The connection point between the signal line and the pin P2 is grounded via a capacitor C4. An internal power supply V6 generated by the external power supply is connected to an emitter of the transistor Q3, and a collector of the transistor Q3 is grounded via a resistor R14.

A current at the connection midpoint between the collector of the transistor Q3 and the resistor R14 is supplied to a CPU 1 that controls the various components in a multi-channel receiver as a connected appliance identification signal. As will be described later with reference to FIGS. 6, 7, and 9, the CPU 1 controls the various components inside the receiver based on the level of the connected appliance identification signal.

Figure 2A:
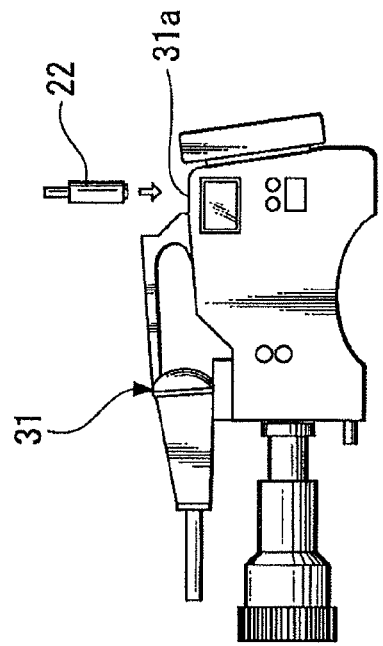
FIGS. 2A and 2B are views showing example systems that use a wireless microphone.
Figure 2B:
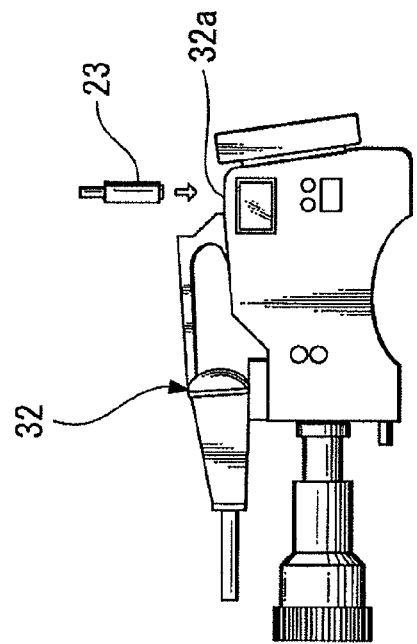
Figure 2B:
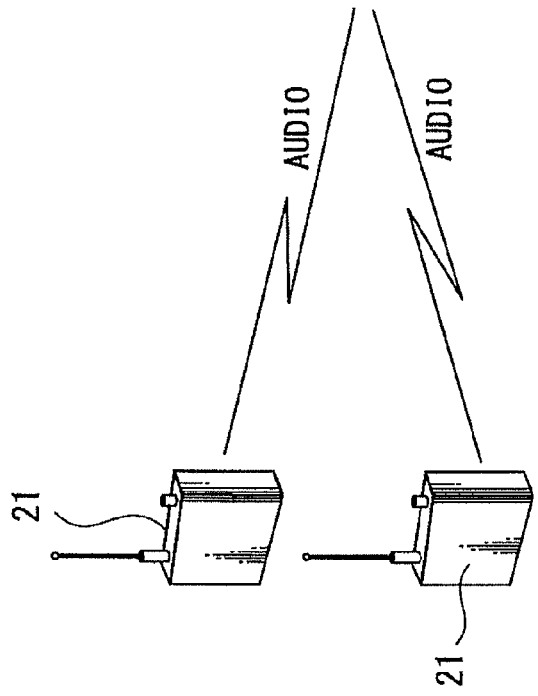
Figures 4A, 4B:
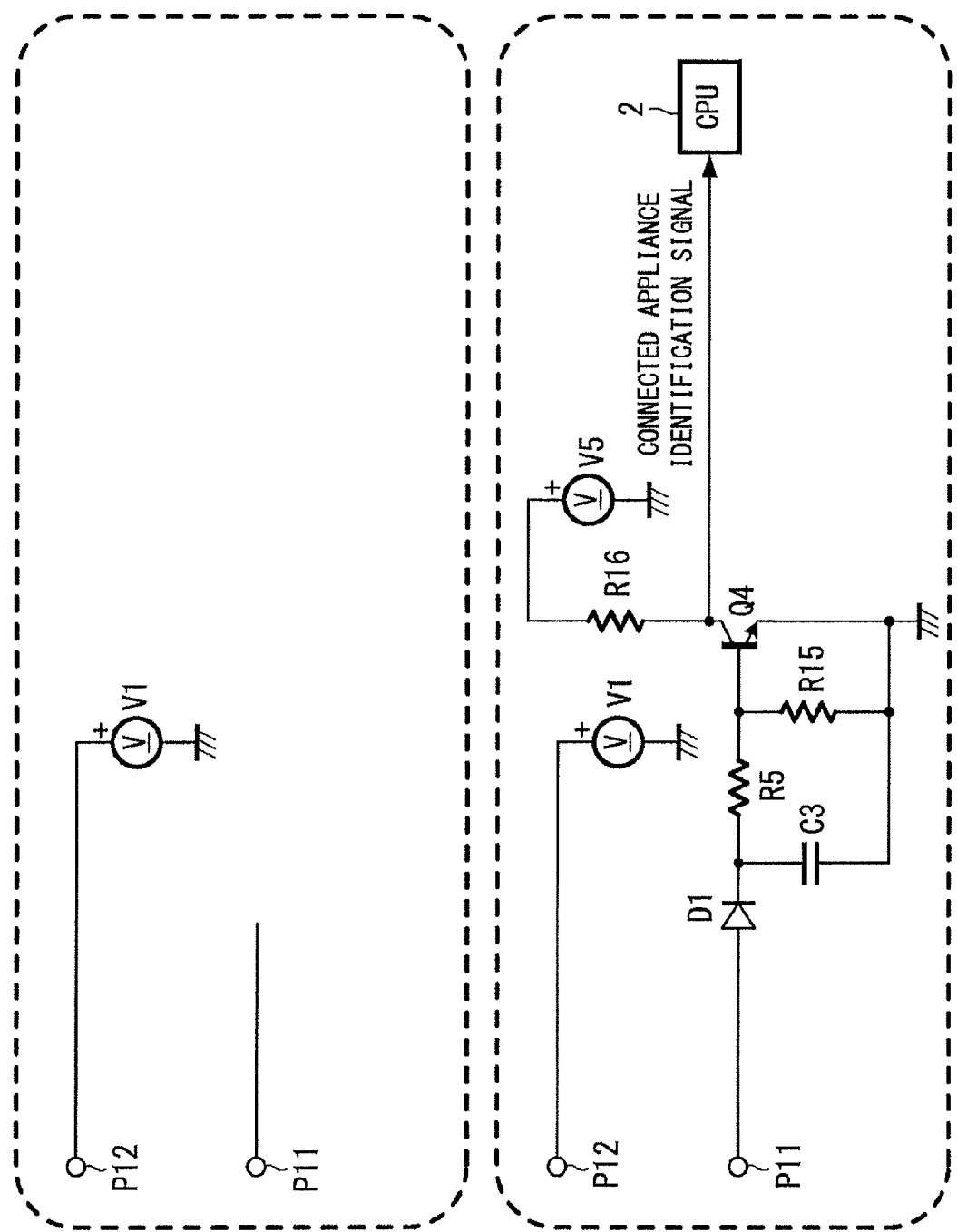
FIGS. 4A and 4B are diagrams showing circuit configurations of parts of video cameras that relate to an embodiment of the invention.

FIG. 4B shows the circuit configuration of a part, of a multi-channel-receiver-compatible camcorder to which an embodiment of the invention has been applied, that relates to an embodiment of the present invention. This video camera is provided with a slot (which corresponds to the slot 32a of the video camera 32 shown in FIG. 2B) for attaching a receiver, with a D-sub 15-pin connector being provided inside this slot. Of this D-sub 15-pin connector, a seventh pin P11 is assigned as a connected appliance identification terminal for identifying a video camera connected to the D-sub 15-pin connector.

Note that with an existing single-channel-receiver-compatible camcorder manufactured by the present applicant (hereinafter simply called "single-channel-receiver-compatible camcorder"), the seventh pin is assigned as a remote control terminal for controlling the power supply of the receiver from the video camera, but in reality is an open terminal that is not connected to anything. In FIG. 4A, the periphery of the 7th pin of the single-channel-receiver-compatible camcorder is shown together with a pin P12 assigned as an external power supplying terminal of the pins of the D-sub 15-pin connector. A power supply V1 inside the video camera is connected to the pin P12.

In a multi-channel-receiver-compatible camcorder to which an embodiment of the invention has been applied, of the fifteen pins of the D-sub 15-pin connector, the pins that are actually used in the single-channel-receiver-compatible camcorder (i.e., the nine pins with the same pin numbers as in the single-channel receiver) are assigned to the same purposes as in the single-channel-receiver-compatible camcorder.

The mechanism for attaching a receiver to this multi-channel-receiver-compatible camcorder is the same as the mechanism for attaching a receiver to the single-channel-receiver-compatible camcorder.

Also, in this multi-channel-receiver-compatible camcorder, as shown in FIG. 4B, the signal line connected to the seventh pin P11 assigned as the connected appliance identification terminal is connected to the base of an npn-transistor Q4 via a diode D1 and a resistor R5. On this signal line, a position between the diode D1 and the resistor R5 is grounded via a capacitor C3 and a position between the resistor R5 and the transistor Q4 is grounded via the resistor R15.

An internal power supply V5 is connected via a resistor R16 to a collector of the transistor Q4. The emitter of the transistor Q4 is grounded.

The current at a connection midpoint between the collector of the transistor Q4 and the resistor R16 is supplied to a CPU 2 that controls the various components inside the multi-channel-receiver-compatible camcorder as the connected appliance identification signal. As described later with reference to FIG. 8 and FIG. 9, the CPU 2 controls the various components inside the video camera based on the level of the connected appliance identification signal.

Next, a state where the D-sub 15-pin connector of the single-channel receiver or multi-channel receiver shown in FIG. 3A or 3B is connected to the D-sub 15-pin connector of the single-channel-receiver-compatible camcorder or multichannel-receiver-compatible camcorder shown in FIG. 4A or 4B, and the operation of the single-channel-receiver-compatible camcorder or multi-channel-receiver-compatible camcorder when connected in this way will be described.

Figure 5:
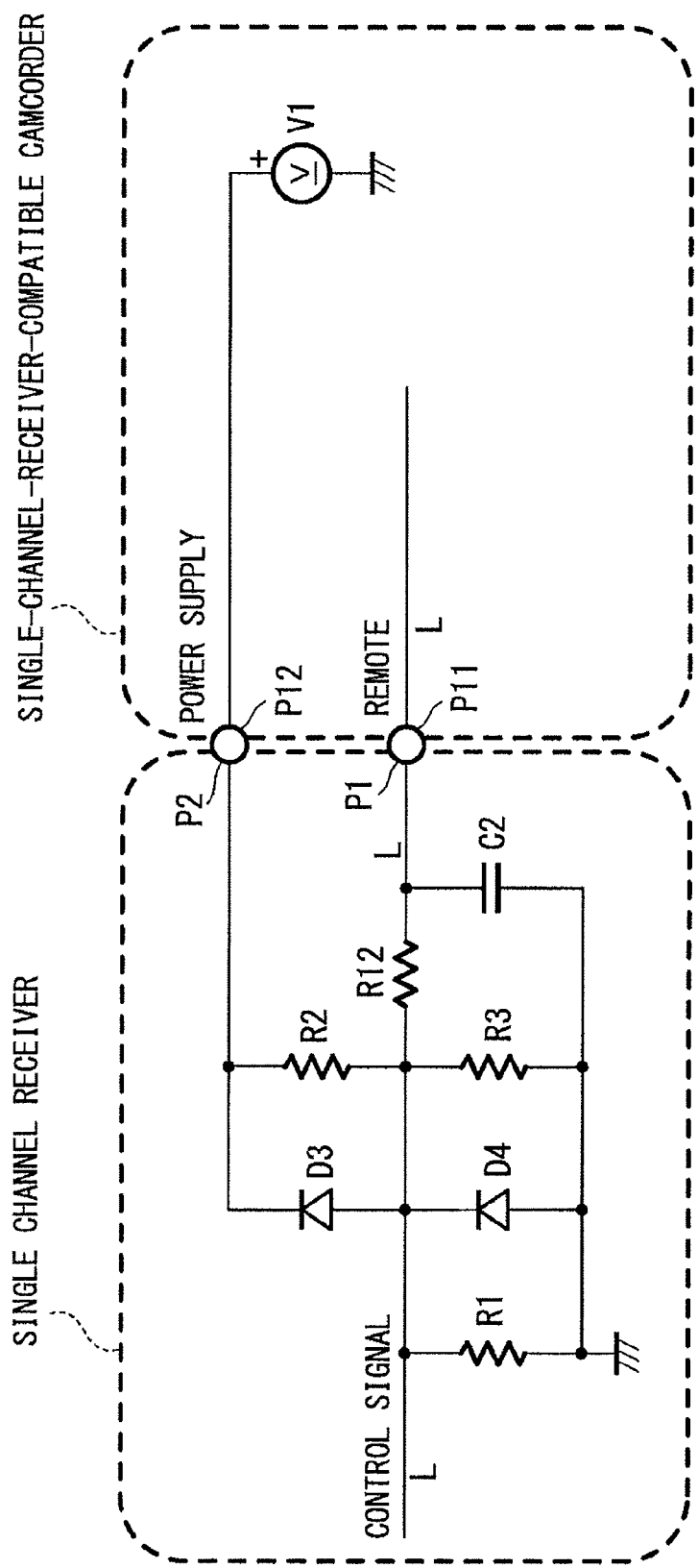
FIG. 5 is a diagram showing a state where a D-sub 15-pin connector of a single-channel receiver has been connected to a D-sub 15-pin connector of a single-channel-receiver-compatible camcorder.

FIG. 5 is a diagram showing a state where the D-sub 15-pin connector of the single-channel receiver shown in FIG. 3A has been connected to the D-sub 15-pin connector of the single-channel-receiver-compatible camcorder shown in FIG. 4A (that is, a state where a single-channel receiver has been attached to the slot of the single-channel-receiver-compatible camcorder).

As described earlier, in a single-channel receiver and a single-channel-receiver-compatible camcorder, the 7th pins P1, P11 of the D-sub 15-pin connectors are assigned as remote control terminals for controlling the power supply of the receiver from the video camera, but in reality, in the video camera, the seventh pin P11 is an open terminal and is not connected to anything.

Accordingly, as shown in FIG. 5, the voltage of the seventh pin P1 in the receiver and the voltage of the seventh pin P11 in the video camera are both at a low (L) level and a remote control signal in the receiver is also at the L level.

Figure 6:
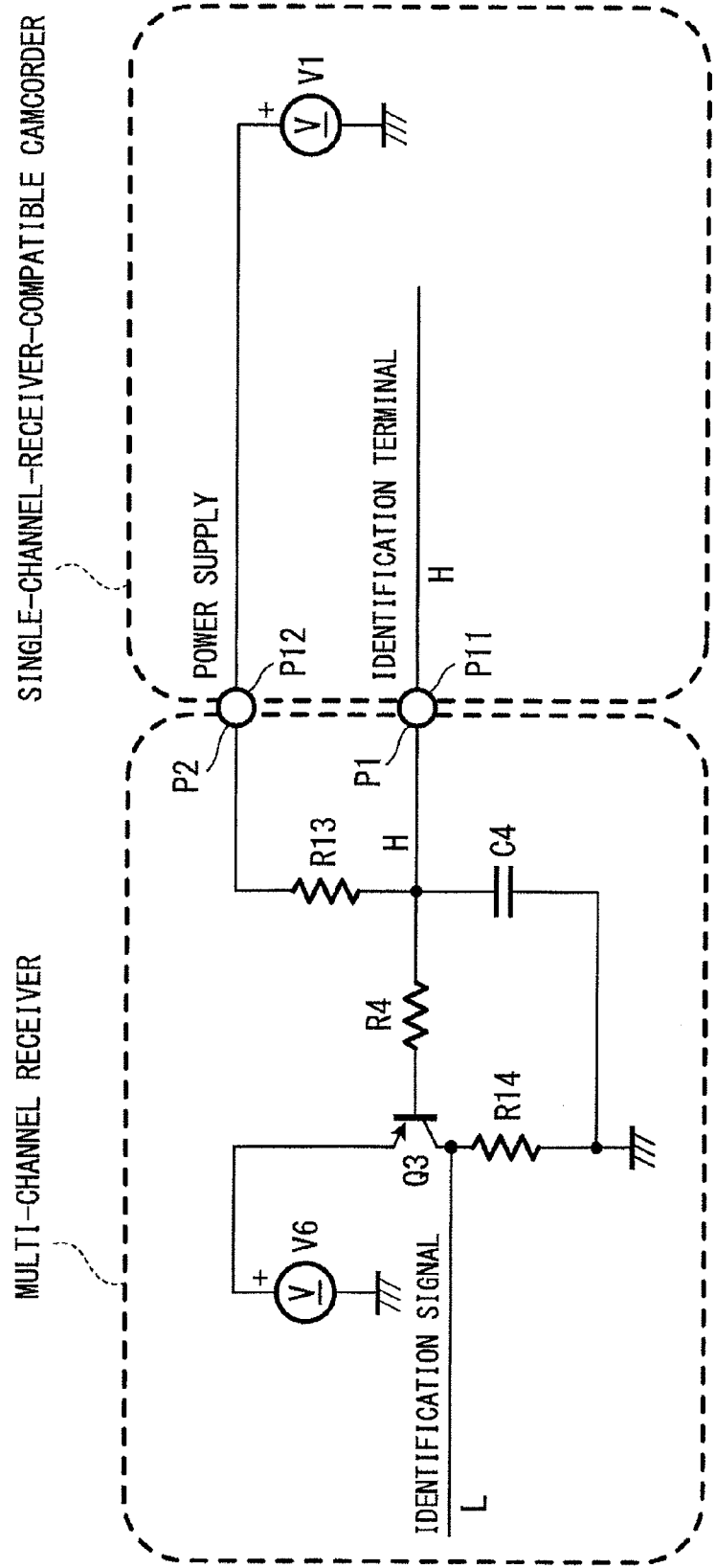
FIG. 6 is a diagram showing a state where a D-sub 15-pin connector of a multi-channel receiver to which the present invention is applied has been connected to a D-sub 15-pin connector of a single-channel-receiver-compatible camcorder.

FIG. 6 is a diagram showing a state where the D-sub 15-pin connector of the multi-channel receiver shown in FIG. 3B to which an embodiment of the invention has been applied has been connected to the D-sub 15-pin connector of the single-channel-receiver-compatible camcorder shown in FIG. 4A (that is, a state where the multi-channel receiver to which an embodiment of the invention has been applied has been attached to the slot of a single-channel-receiver-compatible camcorder).

In this case, as shown in FIG. 6, in the receiver, the voltage of the seventh pin P1 is at a high (H) level and the appliance identification signal is at the L level. In the video camera, the voltage of the seventh pin P11 is at the H level, but since nothing is connected to the seventh pin P11 in the video camera, this has no effect.

When the connected appliance identification signal is at the L level, the CPU 1 inside the receiver shown in FIG. 3B identifies that the video camera connected to the D-sub 15-pin connector is a single-channel-receiver-compatible camcorder.

A single-channel-receiver-compatible camcorder only has a small power supplying capacity designed for a single-channel receiver, and is therefore unable to supply the large power supply required by a multi-channel receiver.

Accordingly, when the connected appliance identification signal is at the L level, the CPU 1 is activated in a state where the operation of the multi-channel receiver is restricted.

"Operation restricting method 1" and "operation restricting method 2" described below are example methods of restricting the operation. Alternatively, the CPU 1 may store a program for restricting the operation of the receiver according to only one of these two methods. As another alternative, a setting operation that selects an arbitrary method of the two methods may be carried out using an operation unit of the receiver and a program for restricting the operation of the receiver using the method selected by the setting operation may be stored in the CPU 1.

Operation Restricting Method 1

Figure 1A:
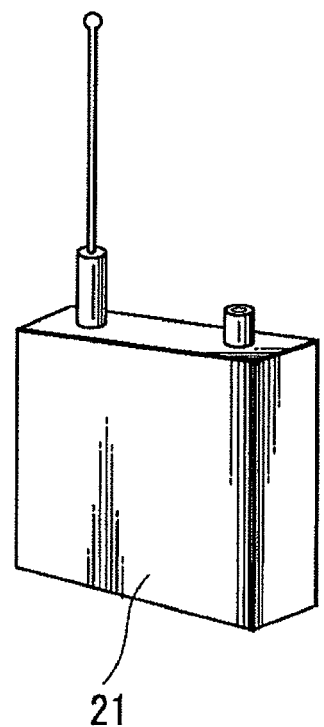
FIGS. 1A and 1B are views showing the appearance of a wireless microphone.
Figure 1B:
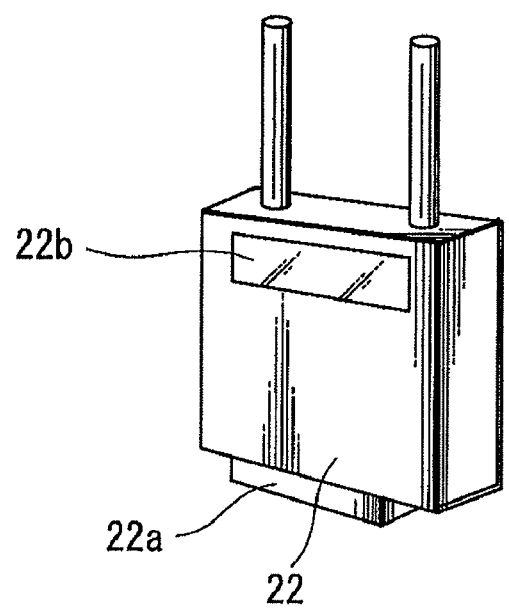

Only a display unit of the receiver (a liquid crystal display corresponding to the display unit 22b shown in FIG. 1B) is operated and other parts are not operated. The display unit is controlled to display the characters "UNABLE TO OPERATE" as shown in FIG. 7A.

Operation Restricting Method 2

In the receiver, of the circuits that receive and demodulate signals on a plurality of channels and output audio signals, only a circuit part that receives and demodulates signals on one channel and outputs an audio signal and a display unit are operated. The display unit is controlled to display the characters "OPERATING ON ONLY ONE CHANNEL" as shown in FIG. 7B.

By restricting the operation of the multi-channel receiver as in these example methods, it is possible when the multi-channel receiver has been attached to the slot of a single-channel-receiver-compatible camcorder to prevent overloading of the circuits inside the video camera.

Figure 8:
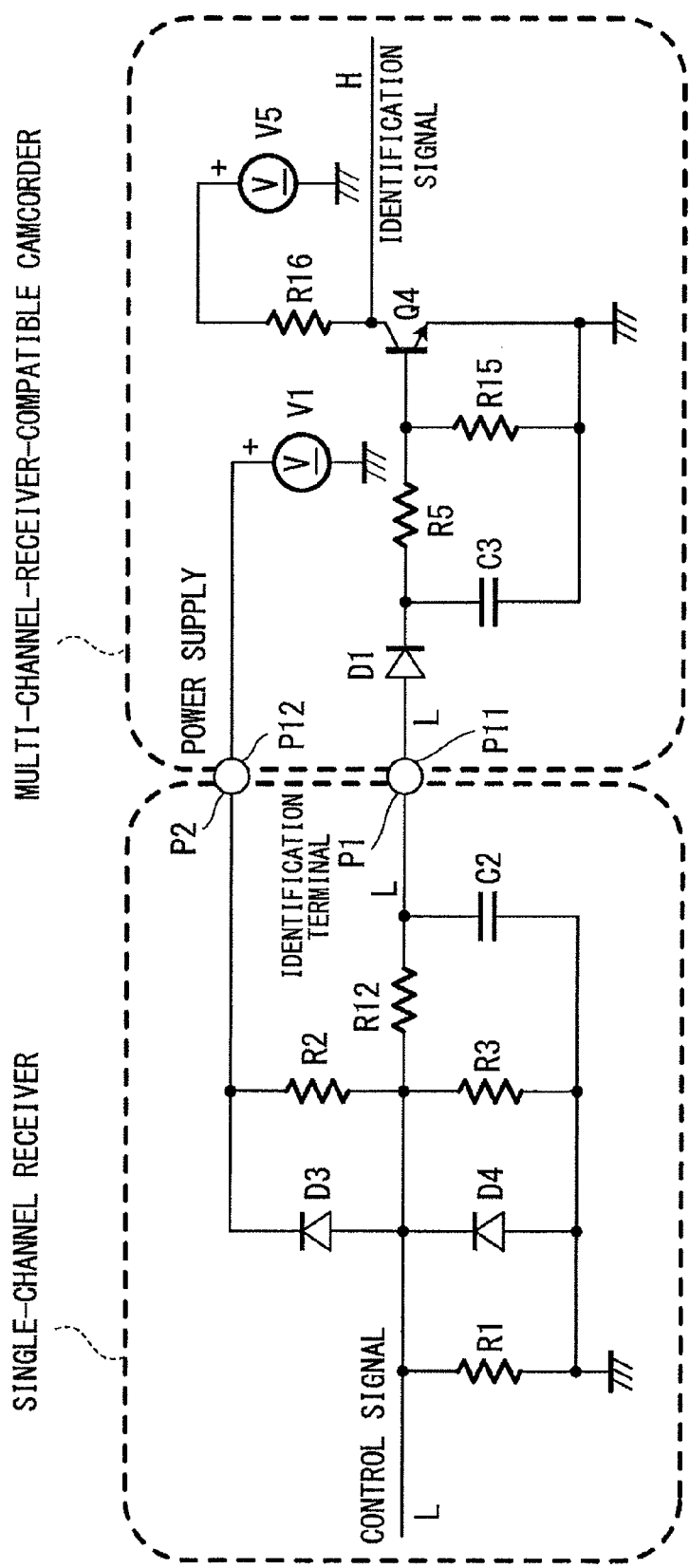
FIG. 8 is a diagram showing a state where a D-sub 15-pin connector of a single-channel receiver has been connected to a D-sub 15-pin connector of a multi-channel-receiver-compatible camcorder to which an embodiment of the invention is applied.

FIG. 8 is a diagram showing a state where the D-sub 15-pin connector of the single-channel receiver shown in FIG. 3A has been connected to the D-sub 15-pin connector of the multi-channel-receiver-compatible camcorder shown in FIG. 4B to which an embodiment of the invention has been applied (that is, a state where a single-channel receiver has been attached to a slot of a multi-channel-receiver-compatible camcorder to which an embodiment of the invention has been applied).

In this case, as shown in FIG. 8, in the receiver, the voltage of the seventh pin P1 is at the L level and the remote control signal is also at the L level. This state is the same as when the receiver has been connected to a single-channel-receiver-compatible camcorder (the state shown in FIG. 5), resulting in compatibility.

Also, in the video camera, although the voltage of the seventh pin P11 is at an intermediate level due to the output voltage from the receiver, by appropriately setting the resistance of the resistor R5 and/or R15 so that a voltage produced by dropping the intermediate level to the L level is supplied to the base of the transistor Q4, the appliance identification signal will be at the H level.

When the connected appliance identification signal is at the H level, the CPU 2 inside the video camera shown in FIG. 4B identifies the receiver connected to the D-sub 15-pin connector as a single-channel receiver.

When a single-channel receiver is attached to the slot of a multi-channel-receiver-compatible camcorder, the signal lines (communication lines and the like) and circuits (audio processing circuits and the like) that are used only when a multi-channel receiver is attached will not be connected, resulting in the risk of noise being produced in the audio signal due to the effects of external noise and/or of the operation of the video camera and the receiver becoming unstable.

Accordingly, when the connected appliance identification signal is at the H level, of the signal lines (communication lines and the like) and circuits (audio processing circuits and the like) for processing audio signals on a plurality of channels inputted from the D-sub 15-pin connector, the CPU 2 disconnects signal lines and circuits aside from those on which a signal on one channel is inputted.

Consequently, even when a single-channel receiver has been attached to the slot of the multi-channel-receiver-compatible camcorder, it is possible to reduce the effects of external noise and the like, to make the video camera operate stably, and also to reduce the power consumption of the video camera in accordance with the number of channels of input audio signals.

Figure 9:
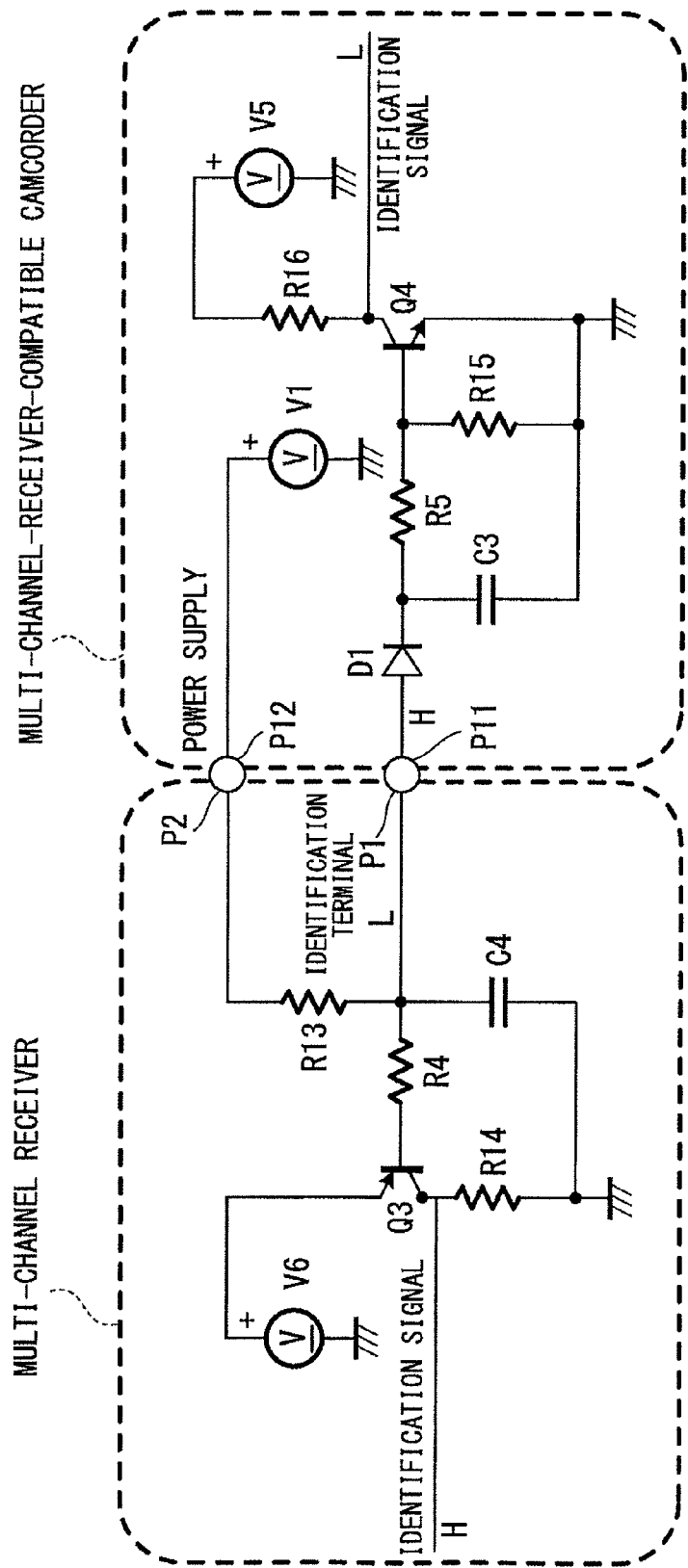
FIG. 9 is a diagram showing a state where a D-sub 15-pin connector of a multi-channel receiver to which the present invention is applied has been connected to a D-sub 15-pin connector of a multi-channel-receiver-compatible camcorder to which an embodiment of the invention is applied.

FIG. 9 is a diagram showing a state where the D-sub 15-pin connector of the multi-channel receiver shown in FIG. 3B to which an embodiment of the invention has been applied has been connected to the D-sub 15-pin connector of the multi-channel-receiver-compatible camcorder shown in FIG. 4B to which an embodiment of the invention has been applied (that is, a state where the multi-channel receiver to which an embodiment of the invention has been applied has been attached to a slot of the multi-channel-receiver-compatible camcorder to which an embodiment of the invention has been applied).

In this case, as shown in FIG. 9, in the receiver, the voltage of the seventh pin P1 is at the L level and the appliance identification signal is at the H level.

In the video camera, the voltage of the seventh pin P11 is at the H level and the appliance identification signal is at the L level.

When the connected appliance identification signal is at the H level, the CPU 1 inside the receiver shown in FIG. 3B identifies the video camera connected to the D-sub 15-pin connector as a multi-channel-receiver-compatible camcorder. When the connected appliance identification signal is at the H level, the multi-channel receiver is activated without restricting the operation.

When the connected appliance identification signal is at the L level, the CPU 2 inside the video camera shown in FIG. 4B identifies the receiver connected to the D-sub 15-pin connector as a multi-channel receiver. The signal lines and circuits for processing the audio signals on multiple channels inputted from the D-sub 15-pin connector are all operated.

As described above, according to the multi-channel receiver to which an embodiment of the invention has been applied, it is possible to automatically identify the video camera to which the receiver is attached as a multi-channel-receiver-compatible camcorder or a single-channel-receiver-compatible camcorder and to control operation inside the receiver in accordance with the identification result. Accordingly, it is possible to facilitate operating the receiver and the video camera when the receiver is attached to a single-channel-receiver-compatible camcorder without changing the mechanism for attaching the receiver to the video camera.

Also, according to the multi-channel-receiver-compatible camcorder to which an embodiment of the invention has been applied, it is possible to automatically identify a receiver attached to the video camera as a multi-channel receiver or a single-channel receiver and to control operation inside the video camera in accordance with the identification result. Accordingly, it is possible to facilitate operating the video camera when the video camera is attached to a single-channel receiver without changing the mechanism for attaching the receiver to the video camera.

Note that in the above description, the configurations of the circuits (the circuits including resistors, capacitors, diodes, and transistors) for generating the connected appliance identification signal shown in FIG. 3B and FIG. 4B are mere examples, and it is possible to generate the connected appliance identification signal from a voltage of the connected appliance identification terminal using a circuit of an appropriate configuration.

Also, although the seventh pin of a D-sub 15-pin connector is assigned as the connected appliance identification terminal in the above description, it is possible to assign another pin aside from the seventh pin that is not used by a single-channel receiver as the connected appliance identification terminal.

Also, although an embodiment of the invention is applied to a receiver and a video camera that are equipped with D-sub 15-pin connectors in the above description, any terminal may be assigned as the connected appliance identification terminal in a receiver and video camera equipped with a connector of a different standard to a D-sub 15-pin connector.

In the above description, the invention is applied to the receiver of a wireless microphone and a video camera connected to such receiver. However, the embodiment of the invention may also be applied to a wireless receiving apparatus that receives a signal aside from an audio signal and is equipped with a connector with a plurality of terminals. The embodiment of the invention may also be applied to an electronic appliance aside from a video camera that is connected to a wireless receiving apparatus using a connector with a plurality of terminals.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless receiving apparatus comprising:
   a connector including a plurality of terminals which comprise a predetermined terminal, the predetermined terminal being assigned as an identification terminal for identifying an electronic appliance connected to the connector;
   a circuit for generating an identification signal of a level corresponding to a voltage level of the predetermined terminal when the electronic appliance is connected to the connector, and for identifying the electronic appliance connected to the connector based on the level of the identification signal, and
   control means operable when the electronic appliance connected to the connector is not identified as an electronic appliance capable of supplying sufficient power for the wireless receiving apparatus, to restrict operation of the wireless receiving apparatus.

2. A wireless receiving apparatus according to claim 1, wherein
   an external power supply is supplied via the connector and whether the electronic appliance connected to the connector is an electronic appliance capable of supplying sufficient power for the wireless receiving apparatus is identified, based on the level of the identification signal.

3. A wireless receiving apparatus according to claim 1, wherein
   the control means is operable when the electronic appliance connected to the connector is not identified as an electronic appliance capable of supplying sufficient power for the wireless receiving apparatus, to prevent the wireless receiving apparatus from operating.

4. A wireless receiving apparatus according to claim 1, wherein
   the wireless receiving apparatus receives signals on a plurality of channels, and
   the control means is operable when the electronic appliance connected to the connector is not identified as an electronic appliance capable of supplying sufficient power for the wireless receiving apparatus, to operate only a part of the wireless receiving apparatus that receives a signal on one channel.

5. A wireless receiving apparatus according to claim 1, further comprising:
   display means, wherein
   the control means displays that operation of the wireless receiving apparatus is restricted on the display means.

6. A wireless receiving apparatus according to claim 1, wherein
   the wireless receiving apparatus receives signals on a plurality of channels,
   the connector is the same as a connector in a wireless receiving apparatus that receives a signal on only one channel, and out of the plurality of terminals, a terminal not used by the wireless receiving apparatus that receives a signal on only one channel is assigned as the identification terminal.

7. A wireless receiving apparatus according to claim 1, wherein
an audio signal is wirelessly received and outputted from the connector.

8. An electronic appliance connected with a wireless receiving apparatus, comprising:
a connector including a plurality of terminals which comprise a predetermined terminal, the predetermined terminal being assigned as an identification terminal for identifying the wireless receiving apparatus connected to the connector;
a circuit for generating an identification signal of a level corresponding to a voltage level of the predetermined terminal when the wireless receiving apparatus is connected to the connector, and for identifying the wireless receiving apparatus connected to the connector based on the level of the identification signal, and
control means that is operable when the wireless receiving apparatus connected to the connector is not identified as a wireless receiving apparatus that receives signals on a plurality of channels, to disconnect signal lines and circuits aside from the signal lines and circuits that input a signal on one channel.

9. An electronic appliance according to claim 8, further comprising:
signal lines and circuits for processing signals on a plurality of channels inputted from the connector, wherein
whether the wireless receiving apparatus connected to the connector is a wireless receiving apparatus that receives signals on a plurality of channels is identified based on the level of the identification signal.

10. An electronic appliance according to claim 8, further comprising:
signal lines and circuits for processing signals on a plurality of channels inputted from the connector, wherein
the connector is the same as a connector in an electronic appliance including signal lines and circuits for processing signals inputted on only one channel, and
out of the plurality of terminals, a terminal that is not used by the electronic appliance including signal lines and circuits for processing signals inputted on only one channel is assigned as the identification terminal.

11. An electronic appliance according to claim 8, wherein
the wireless receiving apparatus wirelessly receives an audio signal and the electronic appliance is an image pickup apparatus that is integrated with a recording apparatus.

* * * * *